United States Patent [19]

Wagner

[11] 4,370,770
[45] Feb. 1, 1983

[54] CUTTING HEAD FOR THREAD CUTTING MACHINES

[75] Inventor: Rudolf Wagner, Stuttgart, Fed. Rep. of Germany

[73] Assignee: Rems-Werk Christian Föll und Söhne GmbH & Co., Waiblingen, Fed. Rep. of Germany

[21] Appl. No.: 169,606

[22] Filed: Jul. 17, 1980

[30] Foreign Application Priority Data

Jul. 20, 1979 [DE] Fed. Rep. of Germany ....... 2929337

[51] Int. Cl.³ ............................................. B23G 5/12
[52] U.S. Cl. ................................. 10/96 R; 10/121; 408/149
[58] Field of Search .................... 10/96 R, 96 T, 120, 10/121; 408/148, 149

[56] References Cited

U.S. PATENT DOCUMENTS

| | | | |
|---|---|---|---|
| 1,753,848 | 4/1930 | Breitenstein | 408/148 X |
| 3,681,802 | 8/1972 | Youtz et al. | 10/96 R |
| 3,735,436 | 5/1973 | Louys | 10/96 R |
| 3,820,180 | 6/1974 | Birkestrand et al. | 408/149 X |
| 4,288,181 | 9/1981 | Sakaguchi et al. | 408/149 X |

FOREIGN PATENT DOCUMENTS 2364728  5/1978  France ................................. 10/96 R

*Primary Examiner*—Gil Weidenfeld
*Assistant Examiner*—Fred A. Silverberg
*Attorney, Agent, or Firm*—Becker & Becker, Inc.

[57] ABSTRACT

A thread-cutting head for pipes, tubes, and the like, with cutting jaws arranged in a cutting-jaw holder. The cutting jaws are radially adjustable by a control disc which is displaceably supported on the cutting-jaw holder and is adjustable by a clamping screw. The control disc for the cutting position of the cutting jaws relative to the cutting jaw holder is adapted to be tensioned and arrested against the force of a spring. The thead-cutting head also has a clamping lever as well as an unlatching abutment projecting into the thread-cutting range. The clamping lever is pivotally journaled on an arresting piece arranged on the control disc about a pivot pin directed transverse to the thread-cutting axis. A catch member is arranged between the cutting-jaw holder and the arresting piece. The clamping lever has a release pin directed against the catch member, and is embodied as an unlatching abutment at that end thereof directed toward the cutting jaw side. The clamping lever may have an additional pivot pin bore, the distance of which to the unlatching abutment of the clamping lever is less than the distance between the pivot pin and the greatest possible thread-cutting diameter of the cutting jaw.

14 Claims, 3 Drawing Figures

CUTTING HEAD FOR THREAD CUTTING MACHINES

The present invention relates to a thread-cutting head for pipes, tubes, and the like, with cutting jaws arranged in a cutting-jaw holder. The cutting jaws are radially adjustable by a control disc which is displaceably supported on the cutting-jaw holder and is adjustable by a clamping screw with attention being directed to U.S. Pat. No. 3,864,774–Fohl dated Feb. 11, 1975, belonging to the assignee of the present invention. The control disc for the cutting position of the cutting jaws relative to the cutting-jaw holder is adapted to be tensioned and arrested against a spring force. The cutting head is also provided with a clamping or tensioning lever as well as an unlocking or unlatching abutment projecting into the thread cutting range.

BACKGROUND OF THE INVENTION

With a known thread cutting head of this type, an automatic opening occurs in such a way that, after reaching a predetermined thread cutting length, the pipe end strikes against an unlocking or unlatching abutment, by means of which the arresting of the pretensioned control disc is released. As a result, the control disc shifts relative to the cutting-jaw holder due to its pretensioning force, and the cutting jaws lift off radially from the thread and release the pipe end. In this instance, the clamping or tensioning lever, embodied as a kind of knee-lever, is pivotally journalled on the outer periphery of the cutting-jaw holder and, in its arresting position, is under the force of a spring bolt. The disadvantage of this thread bolt consists therein that, during release by the unlatching abutment, the tensioning lever, due to the force of the spring bolt, jumps radially upwardly in a sudden manner in the plane of the cutting-jaw holder, so that with every thread cutting process at the moment of opening of the cutting head there exists a considerable danger of accidents which, especially with bent-forward working position of the operator, can cause facial injury. A further disadvantage consists therein that the latching and knee-lever mechanism of the tensioning lever is costly and susceptible to dirt accumulation, whereby a susceptibility to disturbances is created, and that a pinching of the operator's fingers can occur at the knee-lever structure when pressing-down the tensioning lever into the arresting position, so that also with this working step a danger of injury exists.

FIELD OF THE INVENTION

Accordingly, the object of the present invention is to embody a thread-cutting head of the aforementioned type in such a way that, while saving or eliminating the lever parts, a cost-advantageous, mechanically simple and non-jamming arresting and unlatching mechanism is provided, and that a tensioning and opening function is guaranteed which is substantially accident and/or injury proof.

This object, and other objects and advantages of the present invention, will appear more clearly from the following specification in connection with the accompanying drawings, in which:

SUMMARY OF THE INVENTION

Figure 1:
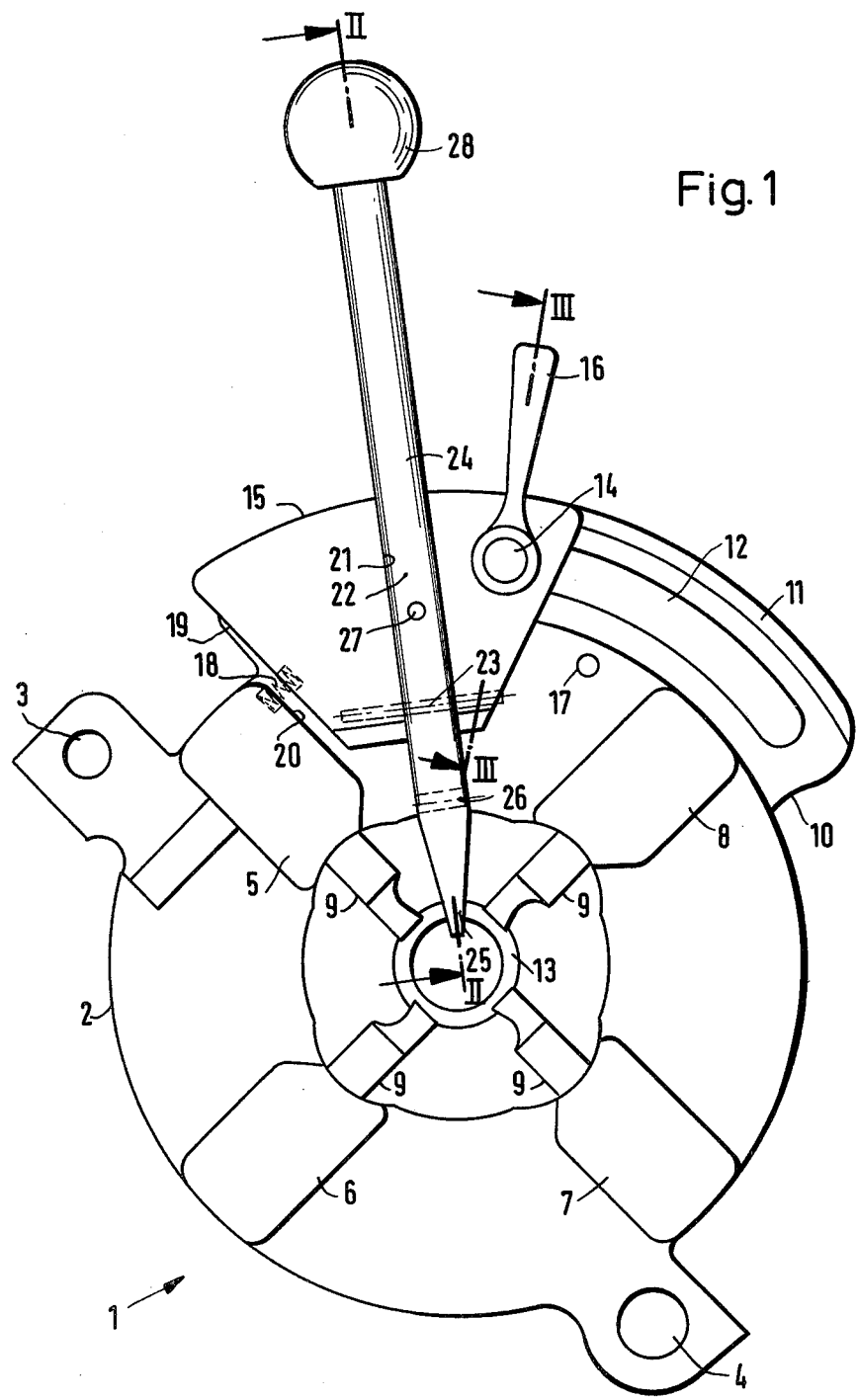
FIG. 1 is a schematic illustration of an inventive thread cutting head in arrested functional position.

The thread-cutting head of the present invention is characterized primarily in that the clamping lever is pivotally journalled on an arresting piece arranged on the control disc about a pivot pin directed transverse to the thread-cutting axis; furthermore, a catch member is arranged between the cutting-jaw holder and the arresting piece; the clamping lever is provided with a release pin directed against the catch member, and on its end directed toward the cutting jaw side is embodied as an unlatching abutment.

In this way the advantage is achieved that the clamping lever is, in radial direction from the grip or handle end up to the unlatching abutment at the other end, embodied as a single continuous rod of constant length without bending or reversing levers or the like, so that when clamping or tensioning the control disc by means of the clamping lever, there is avoided any pinching of the operator's fingers. The control disc, in tensioned position, is arrested by the catch member acting against the arresting piece, the catch member being mounted between the cutting-jaw holder and the arresting piece and thus being covered up, whereby a safe protection against chips and other dirt is assured for attaining a non-jamming functioning of the device.

During thread cutting, the pipe end, after reaching the predetermined thread length, abuts against the unlatching abutment formed onto the cutting-jaw free end of the clamping lever. The clamping lever is slightly pivoted about the pivot pin mounted on the arresting piece transverse to the thread-cutting axis, and this is done in such a manner that the lever part facing away from the unlatching abutment, along with the release pin, moves against the thread cutting direction, so that the release pin presses the catch member away from the arresting piece. In this manner the arresting is released, and the pretensioned control disc with the arresting piece is shifted somewhat relative to the cutting-jaw holder so that, while avoiding a dangerous jumping up of the clamping lever, the cutting jaws are displaced radially outwardly for releasing the pipe end.

Preferred embodiments of the present invention are set forth in further detail in the accompanying specification. By utilizing these features in an advantageous manner, a satisfactory catch-arresting and limited-movement unlatching as well as a reliable arrangement of the clamping lever on the arresting piece and a secure mounting of the arresting piece relative to the cutting-jaw holder and the control disc can be attained.

Pursuant to these preferred embodiments, the catch member may be arranged in a recess of the cutting-jaw holder. The catch member may have a coil or helical spring as well as a latching ball or detent. A corresponding arresting or latching recess may be arranged in the arresting piece, preferably as a break-through or opening, and preferably the release pin is arranged in the opening. The clamping lever may be journalled on the arresting piece in a longitudinal groove, the width and depth of which essentially correspond to the diameter of the clamping lever. A pressure spring may be arranged between the arresting piece and the lever on that lever part facing away from the unlatching abutment. The pressure spring preferably is arranged in the longitudinal groove of the arresting piece. The cutting-jaw holder may have a guide extension mounted in a guide passage of the arresting piece. The clamping screw of the control disc may be arranged in the arresting piece essentially axis parallel to the catch member. A tensioning or clamping-pressure spring may be arranged on one side surface of the arresting piece in the tensioning or clamping direction and may be supported on the cutting-jaw holder. Preferably, a limiting pin is arranged on the cutting-jaw holder in the release direction on that side of the arresting piece located across from the tensioning spring. The unlatching abutment on the clamping lever may be curved counter to the thread-cutting direction, and preferably the clamping bolt or lever has a grip or handle ball at that end thereof remote from the unlatching abutment. The clamping lever may have an additional pivot pin bore, the distance of which to the unlatching abutment of the clamping lever is less than the distance between the pivot pin and the greatest possible thread-cutting diameter of the cutting jaws.

DESCRIPTION OF THE PREFERRED EMBODIMENTS

Referring now to the drawings in detail, the thread-cutting head 1 has a cutting-jaw holder 2 with a fastening hole 3 and a plug bolt or pin (not shown) is adapted to be inserted in an opening 4, as well as having four cutting-jaw guides 5, 6, 7, 8 in which respectively one cutting jaw 9 is mounted. A control disc 10 is connected to the cutting-jaw holder 2; and this control disc 10 has an arc-shaped guide part 11 with a guide opening 12 on its outer periphery; over the range of this opening 12, the control disc 10 is to a limited extent shiftable or displaceable with respect to the cutting-jaw holder 2, whereby the cutting jaws 9 are adjustable in a stepless manner in the radial direction, so that also other thread diameters can be cut aside from the thread diameter of the pipe 13. The control disc 10 can, by means of a clamping screw 14 which passes through an arresting piece 15, and by a screw lever 16, be securely clamped to the arresting piece 15. The arresting piece 15 is connected to the cutting-jaw holder 2 between a limiting bolt or pin 17 and the cutting-jaw guide 5 so as to be displaceable to a limited extent, and the arresting piece 15 is clampable or tensionable against the force of a tensioning spring 18 which is arranged in blind holes on the side surface 19 of the arresting piece 15 and on the narrow side 20 of the cutting-jaw guide 5.

The arresting piece 15 has a longitudinal groove 21 extending in the radial direction in which a tensioning or gripping lever 22 is arranged; the diameter of the lever 22 in essence corresponds to the width and depth of the longitudinal groove 21 and is positively set therein. The lever 22 is pivotally journalled on the arresting piece 15 about a pivot pin 23 which extends transverse to the thread cutting axis. The lower free end of the lever 22 is tapered and curved or bent against the thread cutting direction so as to form an unlatching abutment 25. An additional pivot pin bore 26 is arranged between the pivot pin 23 and the unlatching abutment 25 in the lever 22; the distance of the bore 26 from the unlatching abutment 25 is less than the distance of the pivot pin 23 with respect to the largest adjustable thread diameter. Above the pivot pin 23 the lever 22 has a release stud or pin 27, and at the upper free end of the lever 22 there is provided a grip or handle ball 28.

Figure 2:
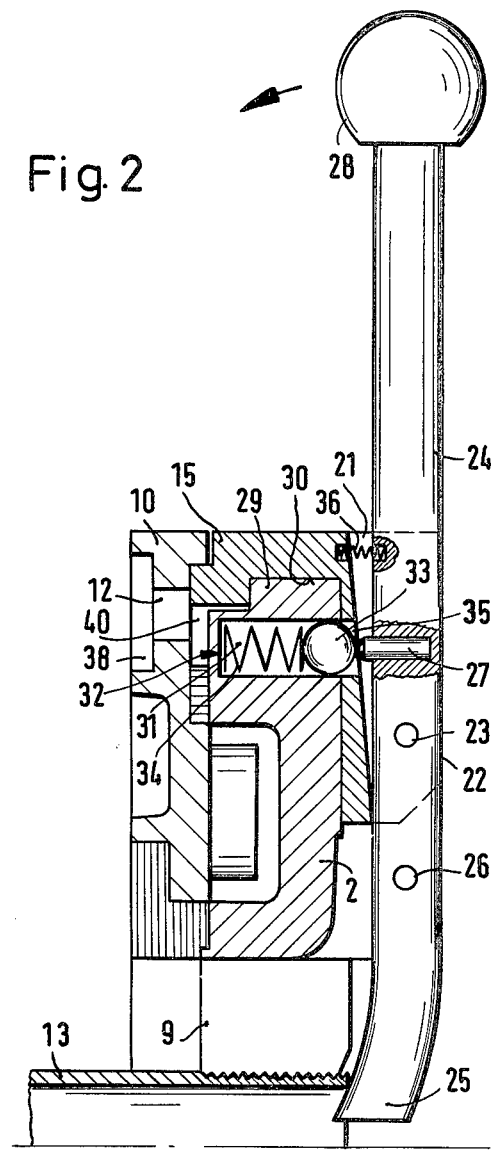
FIG. 2 is a section taken along line II—II in FIG. 1.

FIG. 2 shows that the arresting piece 15 engages the control disc 10 and overlaps the cutting-jaw holder 2, while a guide extension 29 is supported in a guide passage 30 of the arresting piece 15, so that the arresting piece 15 is guided free of play on the cutting-jaw holder 2. A snap or catch member 32 is arranged in a recess 31 of the cutting-jaw holder 2; the member 32 has a helical spring 34 acting upon a latching ball or detent 33. Part of the latching ball or detent 33 is located in a latching or arresting recess 35 of the arresting piece 15, so that the latter is held in the clamped or tensioned position on the cutting-jaw holder 2. The latching recess 35 is embodied as a breakthrough or opening in which the release pin 27 is located, against the free end of which the latching ball or detent 33 engages. A pressure spring 36 is arranged above the release pin 27 between the arresting piece 15 and the grip lever 22 at the upper lever part 24 in the region of the longitudinal groove 21; the ends of the pressure spring 36 are supported in corresponding blind holes.

Figure 3:
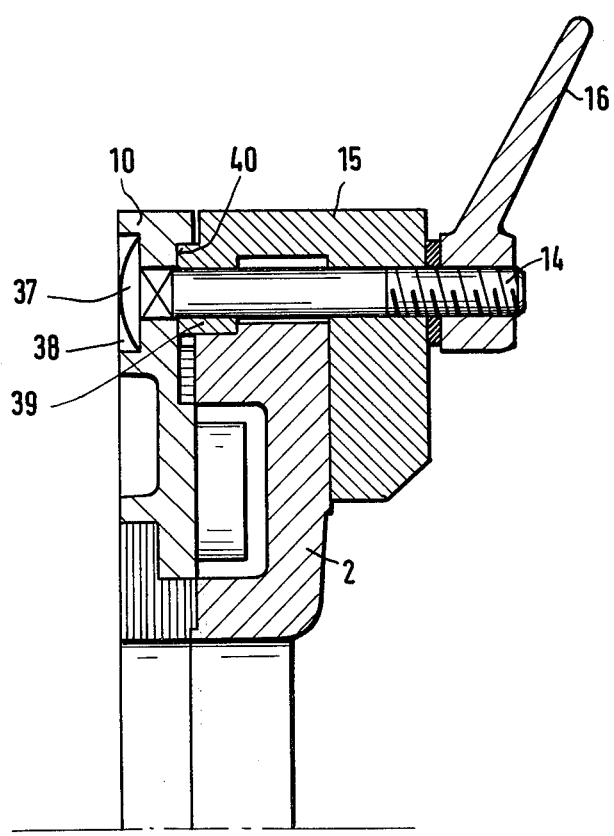
FIG. 3 is a section taken along line III—III in FIG. 1.

FIG. 3 illustrates that the clamping screw 14, which is arranged axis parallel to the snap member 32, passes through the arresting piece 15, and that the head 37 is arranged in a passage 38 of the control disc 10. An extension 39 of the arresting piece 15 is positively supported in a recess 40 of the control disc 10, so that with the screw lever 16 tightened, there is provided a fixed seating or engagement of the arresting piece 15 against the control disc 10.

Especially recognizable in FIG. 2 is that the end of the pipe 13 engages the unlatching abutment 25. When continuing with the cutting of the thread, the lever 22 is pivoted somewhat about the pivot pin 23, whereby the release pin 27 presses the catch member 32 back against the force of the coil spring 34 so that the latching ball or detent 33 comes out of engagement with the latching recess 35 and the arresting is released. In this instance, as recognizable in FIG. 1, the arresting piece 15 is pushed aside a bit by the force of the tensioning or pressure spring 18 until it abuts the limiting bolt 17. Since the arresting piece 15 is connected with the control disc 10 by the clamping screw 14, the control disc 10 is likewise displaced together with the arresting piece 15, so that the cutting jaws 9 slide radially outwardly and release the pipe 13, thus terminating the thread-cutting procedure. For cutting a new thread, lever 22 needs only be moved manually by means of the ball 28 against the force of the tensioning or pressure spring 18. Upon reaching the illustrated final clamping or tensioning position, the arresting piece 15 is then automatically latched with the control disc 10 by the latching of the catch member 32.

If it should become necessary to cut only a short thread, a releasing of the arresting can readily be carried out manually by moving the lever 22 against the force of the pressure spring 36 by means of the grip ball 28 in the direction of the arrow as shown in the drawing.

If in another situation it should become necessary to cut long threads without actuation of the unlatching abutment 25, the lever 22 is displaced upwardly and journalled on the pivot pin 23 by means of the bore 26. Thus a suitably long thread can be cut, while upon termination of the cutting process the arresting likewise can be released manually by movement of the lever 22 in the direction of the arrow (FIG. 2), and the cutting jaws 9 are lifted off from the thread.

The present invention is, of course, in no way restricted to the specific disclosure of the specification and drawings, but also encompasses any modifications within the scope of the appended claims.

What I claim is:

1. A thread-cutting head for pipes, tubes, and the like, comprising in combination:
   a cutting-jaw holder;
   cutting jaws arranged in said cutting-jaw holder and having a cutting position in a thread cutting range relative to a thread cutting axis;
   a control disc displaceably supported on and connected rotatable relative to said cutting-jaw holder, said cutting jaws being radially adjustable by said control disc;
   a clamping screw for adjusting said control disc, which for the cutting position of said cutting jaws relative to said cutting-jaw holder is adapted to be tensioned and arrested against a spring force;
   an arresting piece arranged on said control disc and provided with a pivot pin directed transverse to the thread cutting axis, said arresting piece being shiftable as limited by spring force to move in a peripheral direction of said cutting-jaw holder relative to the holder;
   a single clamping lever pivotally journalled directly on said arresting piece about said pivot pin, that end of said clamping lever located in the region of said cutting jaws being embodied as an unlatching abutment which projects into the thread-cutting range, said lever also having a grip means with which said arresting piece, the unlatching abutment and said control disc are adjustable into a starting position thereof;
   a catch member arranged between said cutting-jaw holder and said arresting piece which is secured against shifting by said catch member in the starting position; and
   a release pin provided on said clamping lever and directed against said catch member, which is adjustable into a position releasing said arresting piece by said release pin actuatable by said clamping lever.

2. A thread-cutting head in combination according to claim 1, in which said cutting-jaw holder is provided with a recess for receiving said catch member.

3. A thread-cutting head in combination according to claim 2, in which said catch member includes a coil spring and a latching ball, and in which said arresting piece is provided with a corresponding arresting recess.

4. A thread-cutting head in combination according to claim 3, in which said arresting piece is provided with a longitudinal groove the width and depth of which essentially correspond to the diameter of said clamping lever, said clamping lever being journalled in said longitudinal groove.

5. A thread-cutting head in combination to claim 4, which includes a pressure spring arranged between said arresting piece and said clamping lever on that portion thereof facing away from said unlatching abutment.

6. A thread-cutting head in combination according to claim 5, in which said arresting piece is provided with a guide passage, and in which said cutting-jaw holder is provided with a guide extension mounted in said guide passage.

7. A thread-cutting head in combination to claim 6, in which said clamping screw of said control disc is arranged in said arresting piece essentially axis-parallel to said catch member.

8. A thread-cutting head for pipes, tubes, and the like, comprising:
   a cutting-jaw holder;
   cutting jaws arranged in said cutting-jaw holder and having a cutting position in a thread cutting range relative to a thread cutting axis;
   a control disc displaceably supported on said cutting-jaw holder, said cutting jaws being radially adjustable by said control disc;
   a clamping screw for adjusting said control disc, which for the cutting position of said cutting jaws relative to said cutting-jaw holder is adapted to be tensioned and arrested against a spring force;
   an arresting piece arranged on said control disc and provided with a pivot pin directed transverse to the thread cutting axis;
   a clamping lever pivotally journalled on said arresting piece about said pivot pin, that end of said clamping lever located in the region of said cutting jaws being embodied as an unlatching abutment which projects into the thread-cutting range;
   a catch member arranged between said cutting-jaw holder and said arresting piece; and
   a release pin provided on said clamping lever and directed against said catch member, said cutting-jaw holder being provided with a recess for receiving said catch member, said catch member including a coil spring and a latching ball, said arresting piece being provided with a corresponding arresting recess, said arresting piece being provided with a longitudinal groove the width and depth of which essentially correspond to the diameter of said clamping lever, said clamping lever being journalled in said longitudinal groove, a pressure spring arranged between said arresting piece and said clamping lever on that portion thereof facing away from said unlatching abutment, said arresting piece being provided with a guide passage, said cutting-jaw holder being provided with a guide extension mounted in said guide passage, said clamping screw of said control disc being arranged in said arresting piece essentially axis-parallel to said catch member, and a tensioning spring which is arranged on one side surface of said arresting piece in a clamping direction, and which is supported on said cutting-jaw holder.

9. A thread-cutting head according to claim 8, in which said arresting recess in said arresting piece is an opening therein, said release pin of said clamping lever being adapted to be received in said opening.

10. A thread-cutting head according to claim 8, in which said pressure spring is arranged in said longitudinal groove of said arresting piece.

11. A thread-cutting head according to claim 8, which includes a limiting pin arranged on said cutting-jaw holder in a release direction on that side of said arresting piece located across from said tensioning spring.

12. A thread-cutting head according to claim 11, in which said unlatching abutment of said clamping lever is curved counter to a thread-cutting direction.

13. A thread-cutting head according to claim 12, in which said clamping lever is provided with a grip ball at that end thereof remote from said unlatching abutment.

14. A thread-cutting head according to claim 12, in which said clamping lever is provided with an additional pivot pin bore, a distance of which to said unlatching abutment of said clamping lever is less than a distance between said pivot pin of said arresting piece and a greatest possible thread cutting diameter of said cutting jaw.

* * * * *